US005473201A

United States Patent [19]

Gantenbein et al.

[11] Patent Number: 5,473,201

[45] Date of Patent: Dec. 5, 1995

[54] CONTROL CIRCUIT MEANS FOR CONTROLLING THE AFTER-RUNNING OF AN OPERATING DEVICE IN A MOTOR VEHICLE

[75] Inventors: Reinhard Gantenbein, Sersheim; Herbert Arnold, Eberdingen, both of Germany

[73] Assignee: Robert Bosch GmbH, Stuttgart, Germany

[21] Appl. No.: 987,351

[22] Filed: Dec. 7, 1992

[30] Foreign Application Priority Data

Dec. 17, 1991 [DE] Germany .......................... 41 41 586.8

[51] Int. Cl.[6] .................................. H02H 7/18; H02J 7/00

[52] U.S. Cl. .......................... 307/10.6; 307/10.7; 320/33; 324/433

[58] Field of Search .................................... 340/436, 438, 340/455, 457, 438, 636; 180/282; 280/735; 307/10.1, 10.7, 9.1, 39, 130; 320/33, 48; 324/433; 455/343, 345

[56] References Cited

U.S. PATENT DOCUMENTS 4,968,965 11/1990 Naitou et al. .......................... 340/436
5,025,203 6/1991 Edwards .................................. 323/268
5,129,713 7/1992 Matsuda .................................. 303/92
5,272,380 12/1993 Clokie .................................. 307/10.7

*Primary Examiner*—Steven L. Stephan
*Assistant Examiner*—Aditya Krishnan
*Attorney, Agent, or Firm*—Michael J. Striker

[57] ABSTRACT

A control circuit arrangement for controlling the after-running of an operating device in a motor vehicle is described, with which after shutting off the ignition the operating device is provided with voltage for a certain time interval by an associated voltage regulator and a switching means including a transistor. The shut off of the voltage provided to the operating device occurs by changing the input potential of the voltage regulator. Otherwise without the arrangement of the invention an external or internal relay is needed to switch off the voltage. In various embodiment the potential change at the control input of the voltage regulator can be controlled by electronic hardware devices or by a microprocessor under the control of software.

17 Claims, 1 Drawing Sheet

CONTROL CIRCUIT MEANS FOR CONTROLLING THE AFTER-RUNNING OF AN OPERATING DEVICE IN A MOTOR VEHICLE

BACKGROUND OF THE INVENTION

The present invention relates to an apparatus for control of the after-running of an operating device in a motor vehicle.

A control circuit device for controlling the after-running of an operating device in a motor vehicle is known comprising a voltage regulator, whose control input is connected with an ignition circuit and battery and which supplies the supply voltage to the operating device.

A motor vehicle, whose motor is controlled with the help of an operating device, has electronic component groups, which must be supplied with voltage after the ignition circuit is opened, not only during operation of the motor vehicle but also after turning the motor off. Usually it is required to maintain the supply of voltage only for a certain time period after the motor is shut off and this certain time period is generally known as the after-running period.

The shut off of the electronic component groups, which are supplied with voltage during the after-running phase, has occurred up to now usually with the help of a relay, which breaks the connection between the electronic component groups and the power supply after a certain time delay depending on the ignition circuit operation. A system, which provides such a shut off, is for example described in German Published Patent Application DE-OS 28 15 780. The use of a relay results in an additional substantial expense and has been avoided in the subsequently described invention.

SUMMARY OF THE INVENTION

It is an object of the present invention to provide a control circuit means for controlling the after-running of an operating device in a motor vehicle, which does not have the above-described disadvantage.

This object, and others which will be made more apparent hereinafter, are attained in a control circuit means for controlling the after-running of an operating device in a motor vehicle comprising a voltage regulator, whose control input is connected with the terminal of an ignition circuit including a battery which is remote from the battery and which supplies the supply voltage of the operating device.

According to the invention, the control circuit means has means for changing a potential at the control input of the voltage regulator to end the after-running occurring after opening the ignition circuit.

This control circuit means according to the invention has the advantage that the operating device itself is still supplied with voltage for a certain time after opening the ignition circuit and then the voltage is cut off without using a relay of the power supply.

It is particularly advantageous that the voltage regulator associated with the operating device still remains in a switched-on state after opening of the ignition circuit because of the potential applied to its control input, while it shuts itself off after the after-running time period as a result of a potential change at its control input and thus also separates the operating device and the consuming devices supplied by the power supply during the after-running time period from the power supply.

Further it is particularly advantageous that the electronic component elements required for controlling the after-running of the operating device can be assembled in a simple electronic circuit and according to the particular embodiment have hardware devices for control of the operating device after-running, in which no additional control signal is required, or a microprocessor portion with software for control of control unit after-running in which the duration of the after-running is determined by the microprocessor portion of the operating device and can be programmed more or less according to choice.

Various embodiments of the invention are possible. The means for changing the potential at the control input can also include means for supplying an electrical charge, particularly a condenser connected electrically with the control input of the voltage regulator. Advantageously the condenser is connected electrically between the control input of the voltage regulator and ground and a resistor is connected electrically between the control input of the voltage regulator and the condenser. Furthermore inclusion of means for limiting a condenser voltage applied across the condenser is also desirable. This means for limiting the condenser voltage can be a Zener diode connected electrically in parallel to the condenser.

In various embodiments the means for changing the potential at the control input of the voltage regulator can include a source of potential of the motor vehicle and at least one resistor connecting electrically the source of potential and the control input so that the duration of the after-running depends on a control signal of the operating device. The source of potential can be located in motor vehicle power supply and the resistor can be so selected that the voltage regulator is kept in the turned-on state. The means for changing the potential at the control input can also include means for switching off the after-running of the operating device including a transistor having an emitter, collector and a base connected electrically to receive the control signal of the operating device to terminate the after-running by shifting the transistor into a blocking state. Alternatively, the resistance is selected so that the potential and the control input turns on the voltage regulator.

The control circuit means also can include means for attenuating interference connected to the control input of the voltage regulator including a plurality of electrically connected resistors and Zener diodes and wherein at least one of the Zener diodes is connected between the control input of the voltage regulator and ground.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
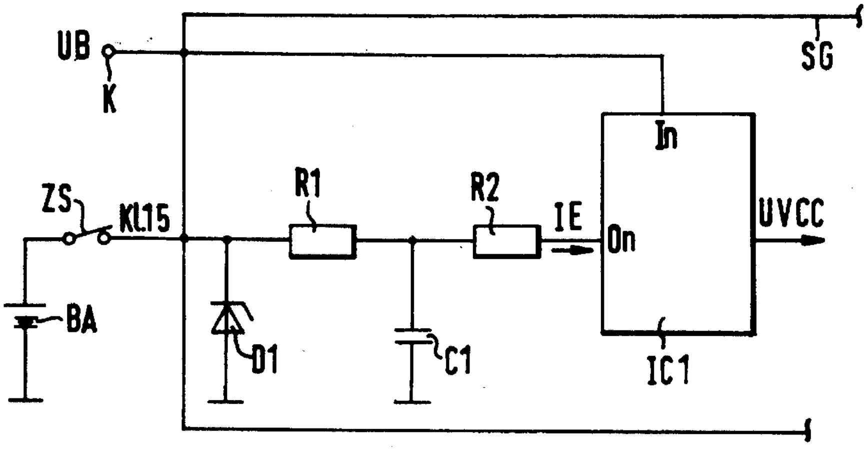
FIG. 1 is circuit diagram of one embodiment of a hardware-controlled after-running control circuit means according to the invention for an operating device of a motor vehicle.

An operating device SG with an internal voltage regulator, which is the integrated circuit IC1 having the inputs On and In, is illustrated schematically in FIG. 1. The input In of the voltage regulator IC1 is connected with the battery voltage terminal K, to which the battery voltage UB is applied.

The input On of the voltage regulator IC1 is connected by the resistors R1, R2 connected in series with the battery terminal K1.15 of the ignition circuit ZS, which is remote from the battery BA and which is usually connected to the positive pole of the Battery BA.

The connection point between the resistors R1 and R2 is connected by the condenser C1 with ground, the connection point between the terminal K1.15 and the resistor R1 is connected to ground via a Zener diode D1 or a diode polarized in a blocking direction.

After opening or deenergizing the ignition circuit, also when the connection between the battery and the resistor R1 is broken, the On-input of the voltage regulator IC1 is controlled additionally with the help of the charge supplied from the condenser C1 until the condenser C1 is discharged as a result of the flow of current IE to he input On of the voltage regulator IC1.

As long as the input On of the voltage regulator IC1 is controlled, it supplies the internal control unit supply voltage UVCC. After decreasing the potential at the input On of the voltage regulator IC1, the voltage UVCC is no longer supplied and the operating device is shut off.

The duration of the after-running corresponds thus to the time, which is necessary to discharge the condenser C1. The capacity of the condenser C1 and the input current IE of the voltage regulator IC1 determine the after-running time.

When the output of the voltage regulator IC1, at which the internal operating device supply voltage UVCC is provided, is only above a predetermined threshold U, it is applied to the input On of the voltage regulator and also the value of the threshold voltage is determined for the entire duration of the after-running.

Because of that, the duration of the after-running can be adjusted by suitable selection of the capacity of the condenser C1 considering the input current IE and by suitable selection of the threshold US as needed.

The Zener diode D1 serves for limiting the condenser voltage during negative and positive interference on the line coming from the ignition circuit ZS, the resistor R1 and R2 serving as protective resistors for the condenser C1 and/or the voltage regulator IC1.

Figure 2:
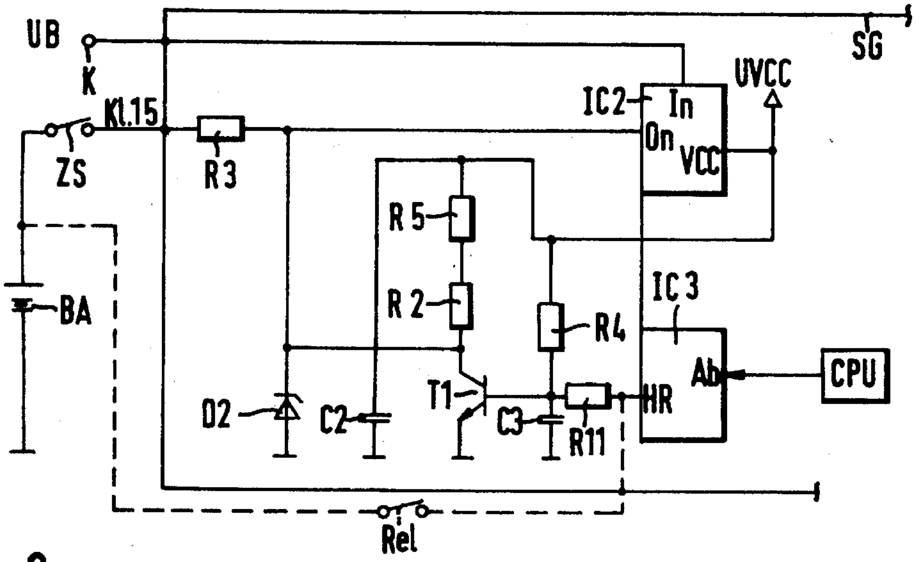
FIG. 2 is a circuit diagram of an embodiment of a microprocessor-controlled after-running control circuit means according to the invention.

In the example shown in FIG. 2 the operating device is again indicated with SG and it has among other components a voltage regulator IC2 and an additional integrated circuit IC3.

The voltage regulator has an input In, which is supplied with the battery voltage UB from the terminal K and an input On, which is connected by a resistor R3 with the remote battery terminal K1.15 of the ignition circuit ZS so that the other side of the ignition circuit ZS is connected with the battery BA.

The output VCC of the voltage regulator IC2, at which the internal operating device supply voltage UVCC is provided, is connected by the series connected resistors R4 and R11 with the input HR of the integrated circuit IC3 and by a series circuit containing R5 and a transistor T1 with ground. The base of the transistor T1 is connected by a condenser C3 with ground and moreover by the resistor R11 with the input HR of the integrated circuit IC3 and the collector of the transistor T1 is connected with the input On of the voltage regulator IC2 and with ground via a Zener diode D2 connected in the blocking direction. The output VCC of the voltage regulator is also connected to ground via the condenser C2.

The integrated circuit IC3, which is connected with the central processor unit CPU of the operating device, receives from it the control signal Ab, which arrives over an internal driver at the output HF of the integrated circuit IC3 and is used for control of the transistor T1. This signal, which is delivered to the output HR, serves in conventional operating devices for control of the main relay Re1, which connection is shown with the dashed lines, because it is not part of the invention.

After shutting off the motor and/or opening the ignition circuit ZS the central processor unit CPU keeps the output HR of the integrated circuit IC3 at Low Potential by means of the control signal Ab until the after-running ends. Thus the On-input of the voltage regulator IC2 is kept above the internal operating device supply voltage UVCC and the resistor R5 is at High Potential. Because of that, the potential at the base of the transistor T1 is high so that the transistor T1 conducts and the potential at the input On of the voltage regulator IC2 is reduced to Low Potential. Because of that, the voltage regulator IC2 switches off and the after-running is finished.

When the after-running is finished, a suitable signal is delivered by the central processor unit CPU, which is applied to the output HR of the integrated circuit IC3 at High-Potential. Because of that, the potential at the base of the transistor T1 is High so that the transistor T1 conducts and the potential at the input On of the voltage regulator IC2 is reduced to Low. Thus the voltage regulator IC2 is switched off and the after-running is ended.

The timing circuit device R4,C3 after switching on the ignition circuit keeps the base of T1 at low and T1 blocked until the output HR of the CPU at Low. The resistor R11 acts as a protective resistance for the output HR.

The resistor R3, which is connected to the terminal K1.15 of the ignition circuit ZS and the Zener diode D2 connected between ground and R3 and/or the input On of the voltage regulator IC2 serve for limiting interference, which could arrive at the operating device from the ignition circuit.

Figure 3:
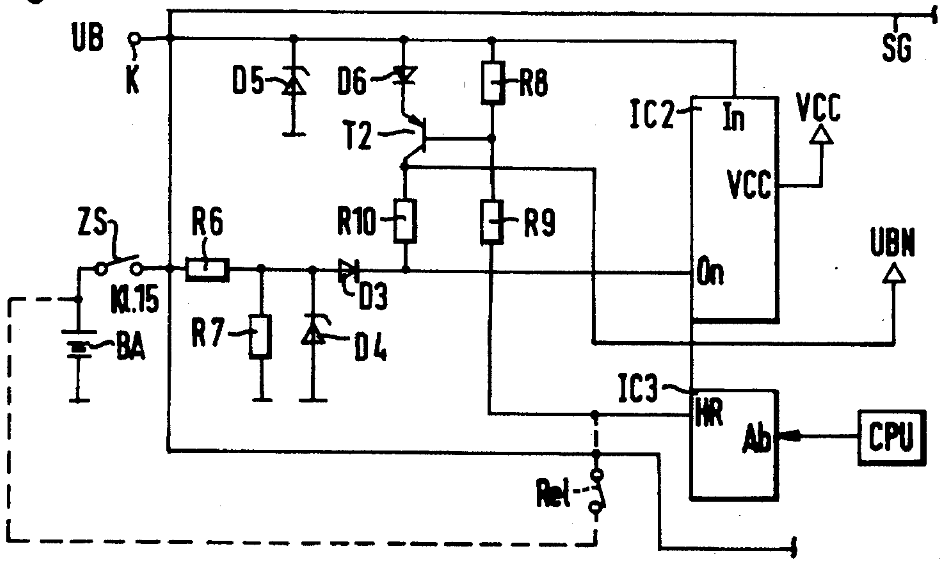
FIG. 3 is a circuit diagram of another embodiment of a microprocessor-controlled after-running control circuit means according to the invention.

In FIG. 3 an additional embodiment of the invention is illustrated, in which again only the component parts which are essential to the invention are illustrated, namely the voltage regulator IC2 and the integrated circuit IC3 and the CPU are schematically illustrated.

The wiring in this embodiment is laid out so that the battery voltage UB is applied to the input In of the voltage regulator IC2, the input On of the voltage regulator IC2 is connected by a diode D3 and a resistor R6 with terminal K1.15. A connection point between resistor R6 and the anode of diode D3 is connected to ground via both an additional Zener diode D4 and the resistor R7, the resistor R7 and the Zener diode D4 being connected thus in parallel.

The additional resistors R8 and R9 are connected in series between the output HR of the integrated circuit IC3 and the input In of the voltage regulator IC2. Also the input In and the input On of the voltage regulator IC2 the series circuit containing the diode D6, the emitter-collector of the transistor T2 and an additional resistor R10 are connected. The voltage UBN is applied to the resistor R10.

The base of the transistor T2 is connected with the connection point between the resistors R8 and R9. The additional Zener diode D4 is connected between the input In of the voltage regulator IC2 and ground. The otherwise standard connection between the IC3, the main relay Rel and the battery BA is again in this embodiment shown with dashed lines, but it is important to realize that this shows a prior art connection and is not part of the embodiment of the invention.

After shutting off the ignition circuit the central processor unit CPU maintains the output HR of the integrated circuit IC3 at Low Potential by the control signal Ab supplied to the integrated circuit IC3 until the after-running should be terminated. Thus the On-Input of the voltage regulator IC2 is maintained by the internal operating device battery voltage UB, which is supplied by the transistor T2 and the resistor R10, on High Potential, so that the voltage regulator IC2 remains switched off until a suitable after-running signal from the CPU. Similarly the operating device is supplied by the emitter-collector of the transistor T2 with the switched battery voltage UBN.

If one such signal is delivered by the integrated circuit IC3 and/or its driver for controlling the transistor T1, the potential at the input of the voltage regulator IC2 drops and the transistor blocks. Also the resistance R7 raises the input potential of the voltage regulator IC2 after switching off the operating device to Low Potential. The resistance R8 guarantees a reliable blocking of the transistor T2 after the control signal Ab is supplied to the integrated circuit IC3.

The resistance R6 and the Zener diode D4 serve for attenuating the interference, which could arrive b terminal K1.15 at operating device SG. The Zener diode D5 limits the voltage at the input In of the voltage regulator IC2 and the diode D3 prevents a current flow from the battery voltage terminal K to the terminal K1.15 from the operating device SG. The diode D6 acts as a protective diode in case of a polarization of the battery terminal.

It will be understood that each of the elements described above, or two or more together, may also find a useful application in other types of structures differing from the types described above.

While the invention has been illustrated and described as embodied in control circuit means for controlling the after-running of an operating device in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a control circuit means for controlling the after-running of an operating device in a motor vehicle, said motor vehicle being provided with an ignition circuit and a battery, said control circuit means comprising a voltage regulator having a control input connected with a terminal of the ignition circuit, said voltage regulator providing a supply voltage of the operating device, the improvement comprising means for changing a potential at the control input of the voltage regulator to end the after-running of the operating device occurring after opening the ignition circuit, the means for changing the potential at the control input of the voltage regulator includes a source of potential of the motor vehicle and at least one resistor connecting electrically the source of potential and the control input so that a duration of the after-running depends on a control signal of the operating device, the source of potential is the motor vehicle power supply and the resistor connecting the power supply and the control input is selected so that the voltage regulator is kept in the turned on state, and means for switching off the after-running of the operating device includes a transistor (T1) having an emitter, collector and a base and wherein the base of the transistor (T1) is connected electrically to receive the control signal of the operating device to terminate the after-running by shifting the transistor (T1) into a blocking state.

2. The improvement as defined in claim 1, further comprising means for supplying an electrical charge and wherein said means for supplying the electrical charge is connected electrically with the control input of the voltage regulator.

3. The improvement as defined in claim 1, further comprising a condenser and wherein the condenser is connected electrically between the control input of the voltage regulator and ground.

4. The improvement as defined in claim 3, further comprising a resistor (R2) connected electrically between the control input of the voltage regulator (IC1) and the condenser (C1).

5. The improvement as defined in claim 3, further comprising means for limiting a condenser voltage of the condenser.

6. The improvement as defined in claim 5, wherein the means for limiting the condenser voltage includes a Zener diode (D1) connected electrically in parallel to the condenser (C1).

7. The improvement as defined in claim 1, further comprising means for attenuating interference connected to the control input of the voltage regulator.

8. The improvement as defined in claim 7, wherein the means for attenuating interference include a plurality of electrically connected resistors and Zener diodes and wherein at least one of the Zener diodes is connected between the control input of the voltage regulator and ground.

9. In a control circuit means for controlling the after-running of an operating device in a motor vehicle, said motor vehicle being provided with an ignition circuit and a battery, said control circuit means comprising a voltage regulator having a control input connected with a terminal of the ignition circuit, said voltage regulator providing a supply voltage of the operating device, the improvement comprising means for changing a potential at the control input of the voltage regulator to end the after-running of the operating device occurring after opening the ignition circuit, the means for changing the potential at the control input of the voltage regulator including a source of potential of the motor vehicle and at least one resistor connecting electrically the source of potential and the control input so that a duration of the after-running depends on a control signal of the operating device; means for generating an internal operating device supply voltage, the resistance being selected so that the potential and the control input turns on the voltage regulator; and means for switching off the after-running of the operating devices including a transistor (T2) having an emitter, collector and a base, the base of the transistor (T2) being connected electrically to receive the control signal of the operating device to terminate the after-running by shifting the transistor (T1) into a blocking state.

10. The improvement as defined in claim 9, further comprising means for delivering a power supply voltage UBN connected to the collector of the transistor (T2).

11. The improvement as defined in claim 9, further comprising means for supplying an electrical charge and wherein said means for supplying the electrical charge is connected electrically with the control input of the voltage regulator.

12. The improvement as defined in claim 9, further comprising a condenser and wherein the condenser is connected electrically between the control input of the voltage regulator and ground.

13. The improvement as defined in claim 12, further comprising a resistor (R2) connected electrically between the control input of the voltage regulator (IC1) and the condenser.

14. The improvement as defined in claim 12, further comprising means for limiting a condenser voltage of the condenser.

15. The improvement as defined in claim 14, wherein the means for limiting the condenser voltage includes a Zener diode (D1) connected electrically in parallel to the condenser.

16. The improvement as defined in claim 9, further comprising means for attenuating interference connected to the control input of the voltage regulator.

17. The improvement as defined in claim 16, wherein the means for attenuating interference include a plurality of electrically connected resistors and Zener diodes and wherein at least one of the Zener diodes is connected between the control input of the voltage regulator and ground.

* * * * *